US012605775B2

(12) United States Patent　(10) Patent No.:　US 12,605,775 B2

Shikama　(45) Date of Patent:　Apr. 21, 2026

(54) BODY FOR GUN DRILL

(71) Applicant: TUNGALOY CORPORATION, Fukushima (JP)

(72) Inventor: Hiroya Shikama, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 499 days.

(21) Appl. No.: 18/300,338

(22) Filed: Apr. 13, 2023

(65) Prior Publication Data

US 2023/0347423 A1　Nov. 2, 2023

(30) Foreign Application Priority Data

May 2, 2022　(JP) ................................. 2022-075668

(51) Int. Cl.
B23B 51/06　(2006.01)

(52) U.S. Cl.
CPC ...... B23B 51/066 (2022.01); B23B 2251/406 (2013.01); B23B 2251/56 (2013.01)

(58) Field of Classification Search
CPC ............... B23B 51/063; B23B 51/066; B23B 2251/406; B23B 2251/56
See application file for complete search history.

(56) References Cited

U.S. PATENT DOCUMENTS 3,054,308 A * 9/1962 Larry ................. B23B 51/0486
　　　　　　　　　　　　　　　　　　D15/139
3,089,359 A 　 5/1963 Poulin 3,963,366 A * 6/1976 Eckle .................... B23B 27/007
　　　　　　　　　　　　　　　　　　408/199
4,620,822 A * 11/1986 Haque .................... B23B 51/04
　　　　　　　　　　　　　　　　　　408/230
8,328,473 B2 * 12/2012 Ito ........................... B23B 51/02
　　　　　　　　　　　　　　　　　　408/230
2002/0085891 A1 　 7/2002 Moore
2011/0033255 A1 * 2/2011 Nomura .............. B23B 51/0486
　　　　　　　　　　　　　　　　　　408/1 R
2013/0309029 A1 　 11/2013 Wenzelburger et al.
2019/0176249 A1 　 6/2019 Shiota
2021/0260670 A1 　 8/2021 Naito et al.

FOREIGN PATENT DOCUMENTS

DE 　　　 3200674 C2 * 12/1989 　 ........ B23B 51/0486
DE 　 103 51 327 A1 　 6/2005
EP 　　 2239076 A1 　 10/2010

(Continued)

*Primary Examiner* — Eric A. Gates

(74) *Attorney, Agent, or Firm* — Studebaker Brackett PLLC

(57) ABSTRACT

Provided is a body capable of suppressing the bending of the body during machining. A body includes: a first attachment part serving as a portion that is provided on a leading end side and has a cutting edge mounted thereon; and a second attachment part serving as a portion that is provided at a position different from a position of the first attachment part along a circumferential direction and has a guide pad attached thereto on the leading end side. One discharging groove that extends from the leading end side to a base end side and is used to guide and discharge a fluid to the base end side is formed on an outer peripheral surface of the body, and at least a part of the discharging groove is bent.

3 Claims, 9 Drawing Sheets

(56) References Cited

FOREIGN PATENT DOCUMENTS

| FR | 855277 | A | * | 5/1940 |
|----|--------|---|---|--------|
| JP | S58-22210 | U | | 2/1983 |
| JP | 04111708 | A | * | 4/1992 |
| JP | 2001-515411 | A | | 9/2001 |
| JP | 2006-192553 | A | | 7/2006 |
| JP | 2018-192610 | A | | 12/2018 |
| JP | 2019-104102 | A | | 6/2019 |
| JP | 6671678 | B1 | | 3/2020 |

* cited by examiner

BODY FOR GUN DRILL

BACKGROUND

Field

The present invention relates to a body for a gun drill.

Description of Related Art

As a tool used to form a deep hole having a small diameter, a gun drill has been known. The gun drill has a cutting edge at the leading end portion of a slender body. Generally, one cutting edge is provided, or a plurality of cutting edges are provided at positions asymmetrical around a rotational center axis. In such a configuration, a force in a biased direction is applied to a cutting edge during machining. Therefore, as described in Patent Publication JP-A-2019-104102, a guide pad is provided at the leading end portion of the body of a gun drill in many cases. Since the guide pad abuts on the inner surface of a hole to be cut during machining, it is possible to suppress the deformation or the like of the body due to the force.

SUMMARY

A force received by a cutting edge and a force received by the guide pad during machining are applied to different positions along the longitudinal direction of the body. Therefore, the respective forces do not cancel each other to become zero, and bending moment by which the body is bent is applied to the body.

The body is provided with a groove used to discharge a coolant. When a direction, in which the central part of the body in the longitudinal direction makes an attempt to displace due to the bending moment, and a bending direction, in which cross-sectional secondary moment reduces with the formation of the groove, agree with each other, the body is largely bent during machining. As a result, there is a possibility that a part of the body contacts the inner surface of a machined hole and machining accuracy reduces.

The present invention has an object of providing a body capable of suppressing the bending of the body during machining.

An aspect of the present invention provides a body for a gun drill, the body including: a first attachment part serving as a portion that is provided on a leading end side and has a cutting edge mounted thereon; and a second attachment part serving as a portion that is provided at a position different from a position of the first attachment part along a circumferential direction and has a guide pad attached thereto on the leading end side. One discharging groove that extends from the leading end side to a base end side and is used to guide and discharge a fluid to the base end side is formed on an outer peripheral surface of the body, and at least a part of the discharging groove is bent.

In the body having the above configuration, at least a part of the discharging groove is bent. Therefore, a direction in which the central part of the body in a longitudinal direction makes an attempt to displace due to bending moment during machining and a bending direction in which cross-sectional secondary moment reduces with the formation of the groove may be different from each other. Thus, it is possible to further suppress the bending of the body during machining than before.

As a more preferred aspect, at least the part of the discharging groove may be bent to be oriented to an opposite side to a rotating direction gradually toward the base end side from the leading end side.

As a more preferred aspect, when viewed along a rotational center axis, a change amount of an angle of an inner surface of the discharging groove may fall within 40 degrees, with a position of the discharging groove being changed from the leading end side to the base end side.

As a more preferred aspect, a ratio of the discharging groove may account for 20% or more in a cross section obtained when a portion of the body that is located closer to the base end side than the first attachment part and the second attachment part is cut off perpendicularly with respect to the rotational center axis.

As a more preferred aspect, the second attachment part may be provided in plurality to be aligned along the circumferential direction.

According to the present invention, a body capable of suppressing the bending of the body during machining is provided.

BRIEF DESCRIPTION OF DRAWINGS

FIGS. 7A and 7B are views for describing forces applied to the body according to the comparative example during machining;

DETAILED DESCRIPTION

Hereinafter, the present embodiment will be described with reference to the accompanying drawings. In order to facilitate the understanding of the description, the same constituting elements in the respective drawings will be denoted by the same symbols as much as possible, and their duplicated descriptions will be omitted.

Figure 1:
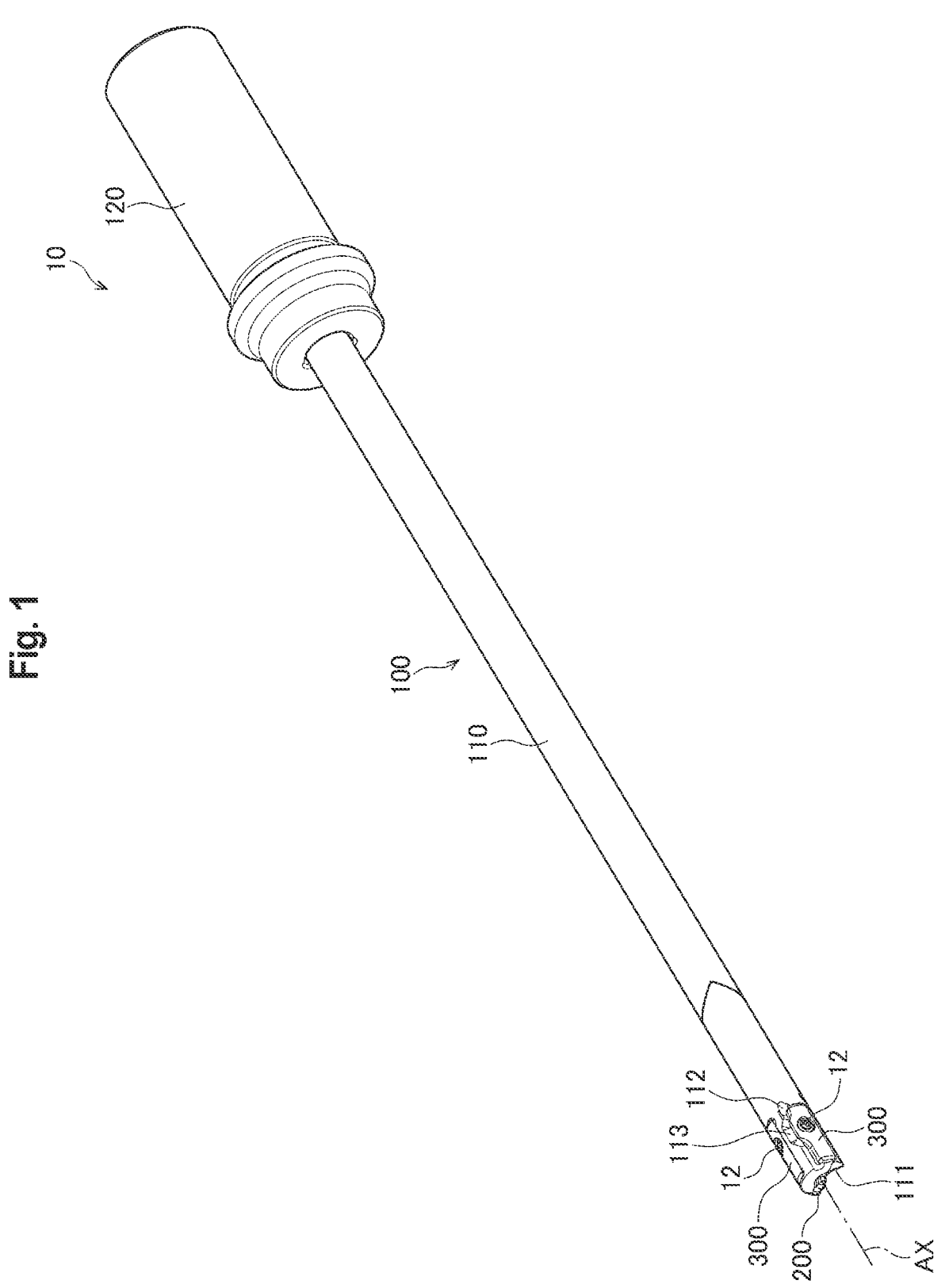
FIG. 1 is a perspective view showing the entire configuration of a gun drill according to the present embodiment.
Figure 2:
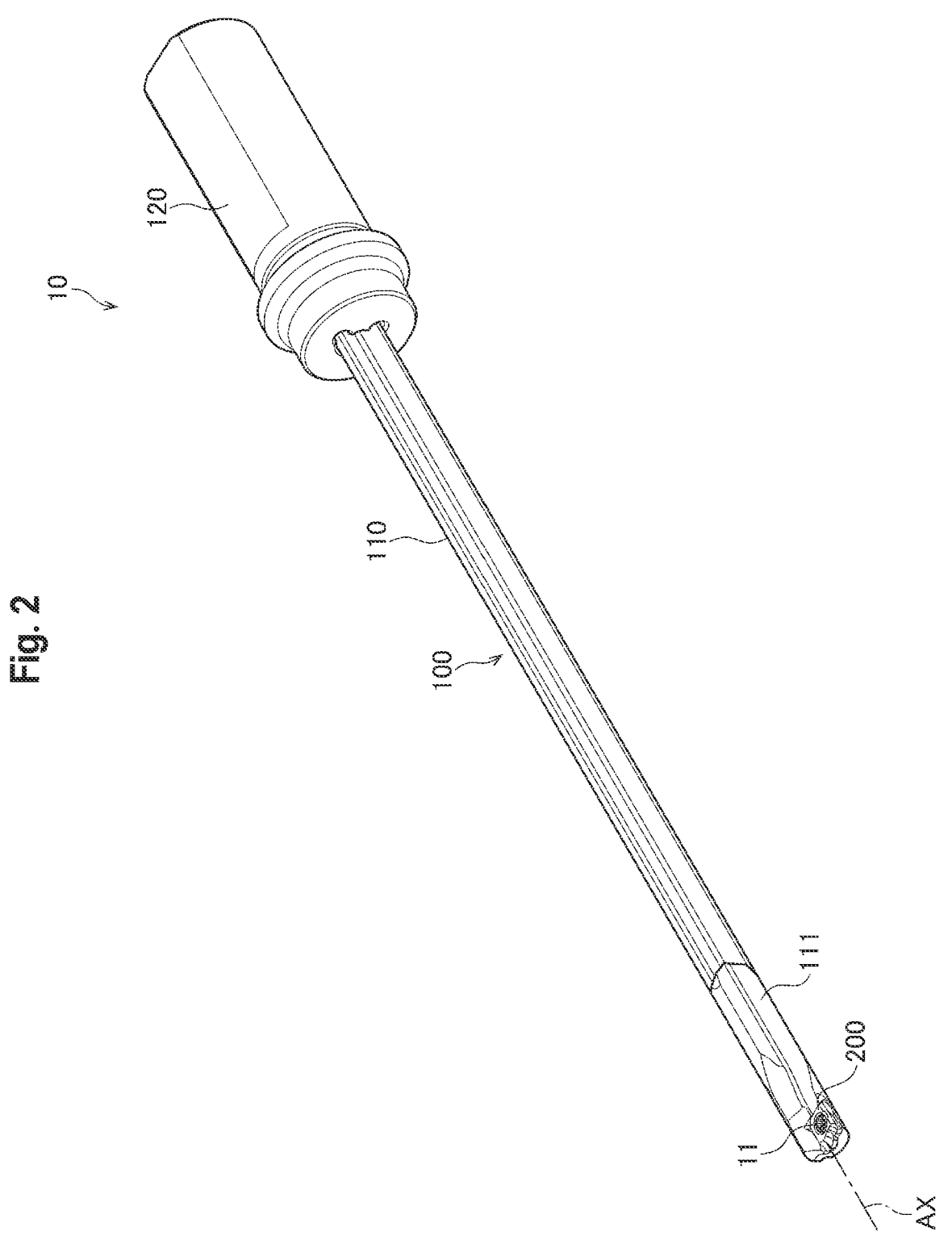
FIG. 2 is a perspective view showing the entire configuration of the gun drill according to the present embodiment.
Figure 3:
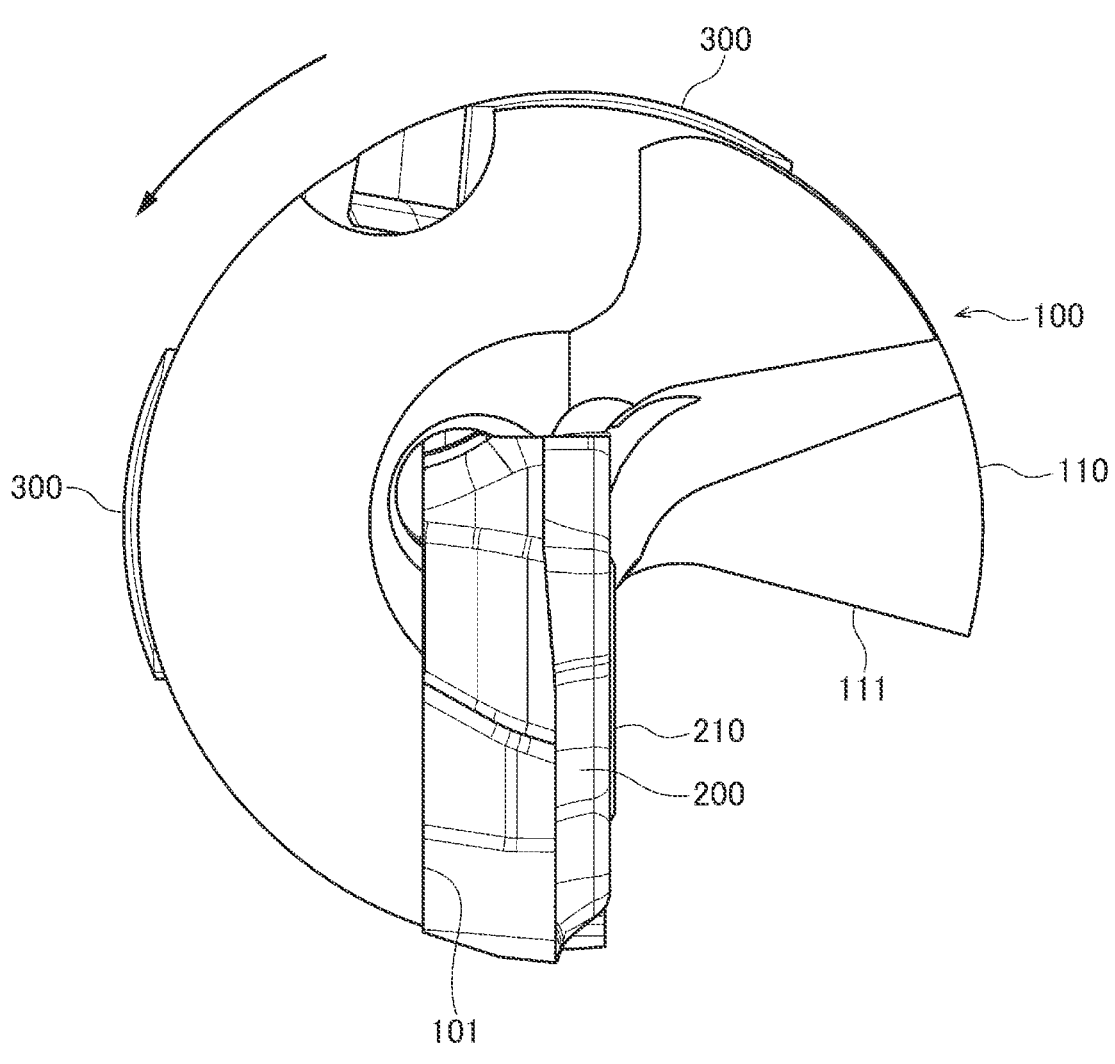
FIG. 3 is a view of the gun drill according to the present embodiment when viewed from a leading end side along its rotational center axis.
Figure 4:
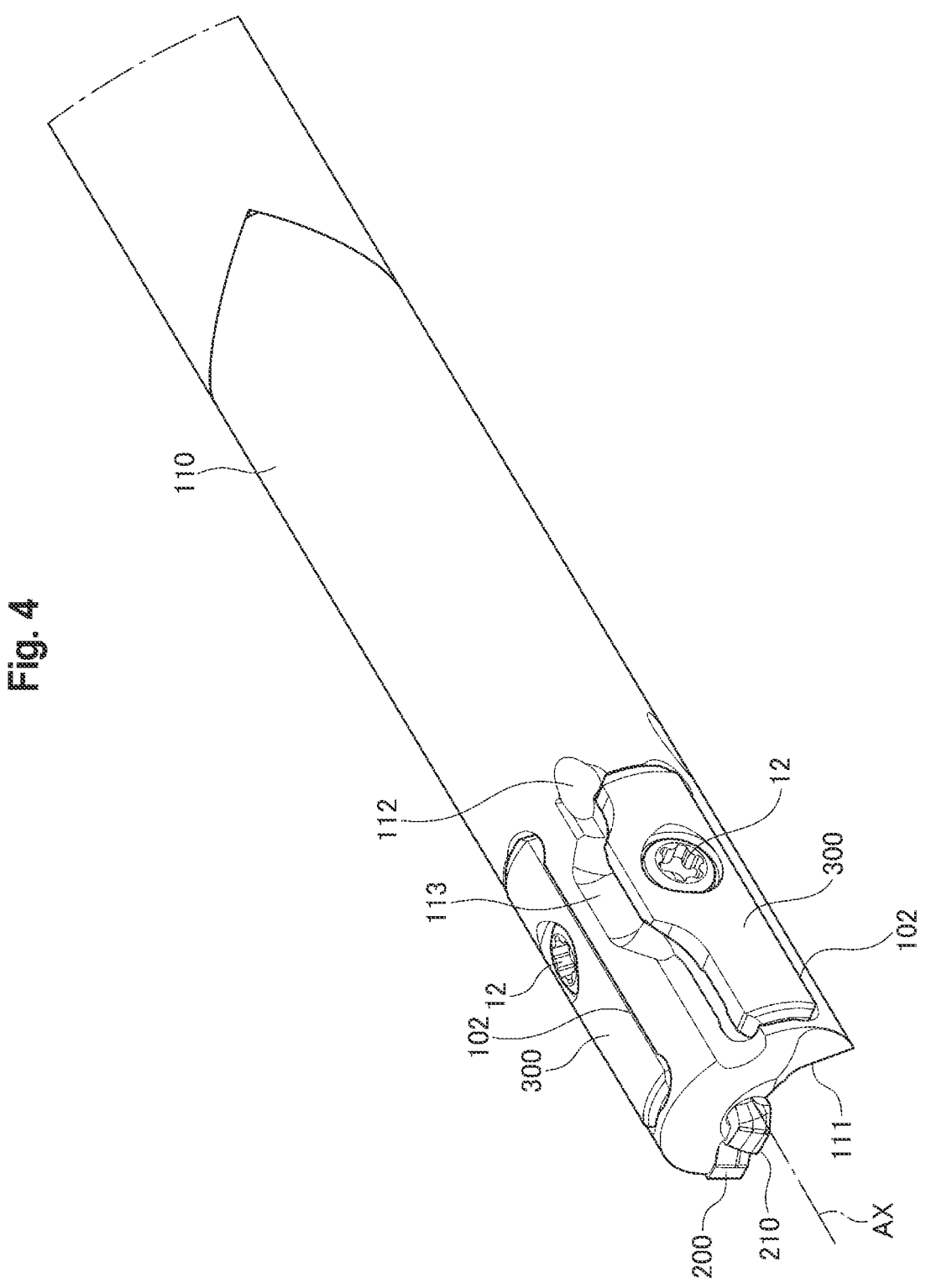
FIG. 4 is a view showing a part of FIG. 1 in an enlarged fashion.
Figure 5:
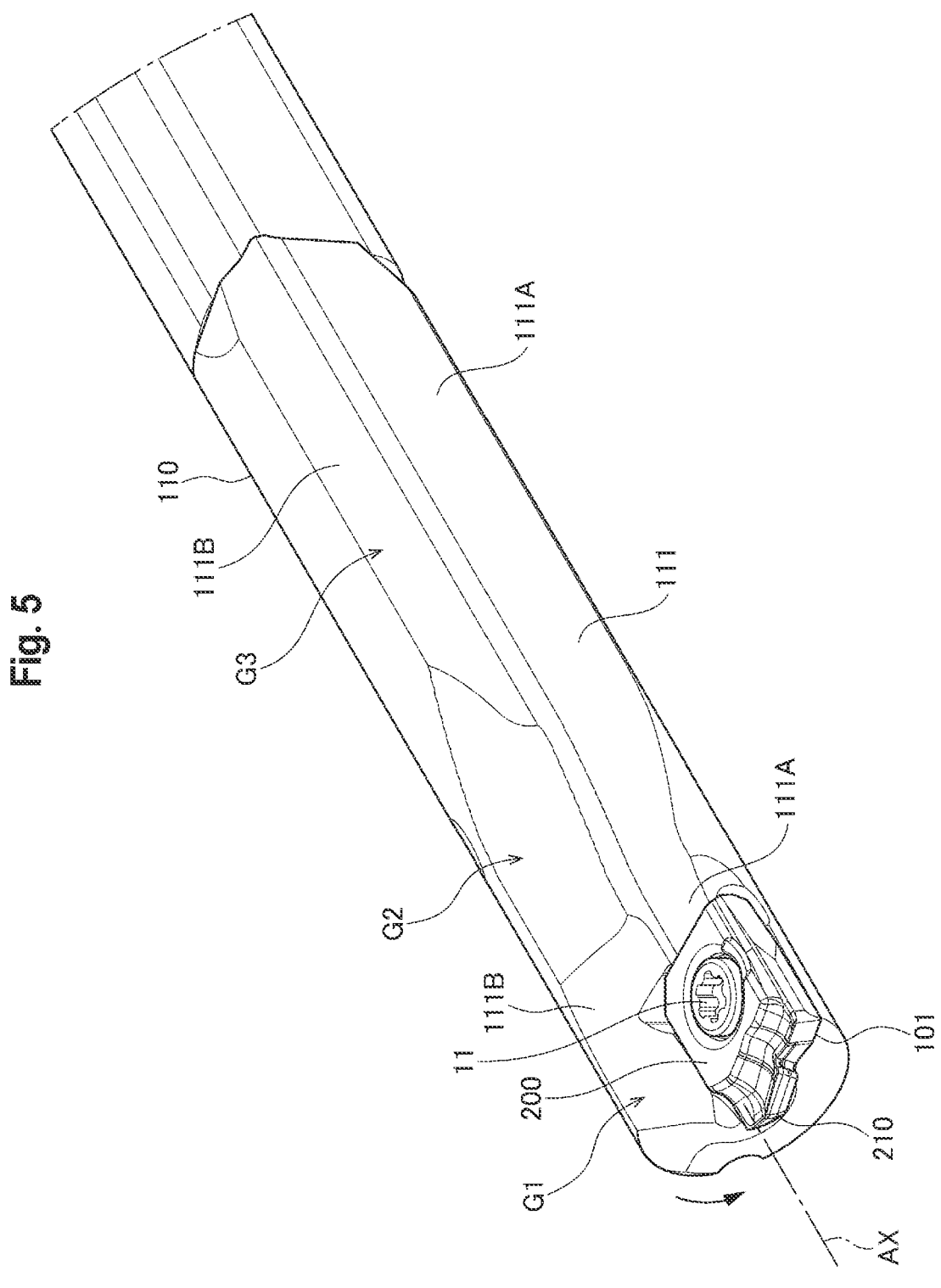
FIG. 5 is a view showing a part of FIG. 2 in an enlarged fashion.

The configuration of a gun drill 10 according to the present embodiment will be described. FIGS. 1 and 2 are perspective views showing the entire configuration of the gun drill 10. FIG. 3 is a view of the gun drill 10 of FIG. 1 when viewed from a leading end side along its rotational center axis AX. FIG. 4 is a view showing a part of FIG. 1, specifically, the leading end portion of the gun drill 10 in an enlarged fashion. FIG. 5 is a view showing a part of FIG. 2, specifically, the leading end portion of the gun drill 10 in an enlarged fashion.

As shown in FIG. 1 or the like, the gun drill 10 includes a body 100, a cutting insert 200, and guide pads 300.

The body 100 is a member constituting substantially the entirety of the gun drill 10 and formed of steel. The body 100 has a part to be gripped 120 and a cutting part 110. The part to be gripped 120 is a portion that is located on one side along the longitudinal direction of the body 100 and gripped by a machine tool not shown.

For the convenience of the description, the end side of the body 100 on which the part to be gripped 120 is provided will also be called a "base end side" below. Further, the side opposite to the base end side will also be called a "leading end side" below.

The cutting part 110 is the portion of the body 100 that is located closer to the leading end side than the part to be gripped 120 and used to cut off a material to be cut. The cutting part 110 is formed so as to extend linearly from the part to be gripped 120 to the leading end side. As shown in FIG. 3, the cutting part 110 is formed in a substantially cylindrical shape and has a discharging groove 111 on its side surface. The discharging groove 111 is a groove that is used to guide and discharge a coolant during machining and formed so as to extend from the leading end side to the base end side. The coolant is a fluid supplied from a machine tool side during machining for the purpose of discharging chips, cooling, lubricating, and rustproofing a tool and a material to be cut, or the like. The discharging groove 111 is not formed in a linear shape as a whole along the longitudinal direction of the cutting part 110 but is partially bent (at a portion denoted by "G2" in FIG. 5). A reason for this configuration will be described later.

The cutting insert 200 is a portion having a cutting edge 210 and formed of a carbide material. The cutting insert 200 is fastened by a screw 11 at a position near the end on the leading end side of the inner surface of the discharging groove 111. Note that mounting parts 101 (mounting seats) used to mount the cutting insert 200 are provided at respective portions corresponding to the cutting insert 200 on the leading end side of the body 100, and the cutting insert 200 is mounted on the respective mounting parts 101. The mounting parts 101 correspond to "first attachment parts" in the present embodiment.

A cutting edge 210 of the cutting insert 200 is further projected toward the leading end side from the leading end of the cutting part 110. During the machining of a material to be cut, the body 100 rotates about the rotational center axis AX. The rotating direction of the body 100 is a direction in which chips caused during machining abut on the rake surface of the cutting insert 200, specifically, a direction shown by an arrow in FIG. 3. When the body 100 rotates, a material to be cut is cut off by the abutment of the cutting edge 210 and a deep hole is formed in the material to be cut. The gun drill 10 according to the present embodiment has the cutting edge 210 as a replaceable separate part as described above and is constituted as a so-called "tip-replaceable-type" tool. Instead of such a configuration, the cutting edge 210 may be configured to be brazed to and integrated with the body 100.

The body 100 of the gun drill 10 according to the present embodiment is a so-called "single-flute-type" tool, and only the one discharging groove 111 is formed. In order to correspond to the one discharging groove 111, the one cutting edge 210 is provided.

The guide pads 300 are members that are used to suppress the deformation or the like of the body 100 by abutting on the inner surface of a hole during machining. A hole formed in a material to be cut by the machining of the gun drill 10 will also be called a "machined hole" below. The provision of the guide pads 300 enables machining while maintaining the straightness or circularity of a machined hole. Note that attachment parts (pockets) 102 used to attach the guide pads 300 are provided at respective portions corresponding to the guide pads 300 on the leading end side of the body 100, and the guide pads 300 are attached to the respective attachment parts 102. The positions at which the attachment parts 102 are provided are different from the positions at which the mounting parts 101 are provided along the circumferential direction. The attachment parts 102 correspond to "second attachment parts" in the present embodiment.

When the cutting edge 210 is provided only at one spot in the circumferential direction like the present embodiment, a force in a biased direction is applied to the cutting edge 210 during machining. Therefore, the provision of the guide pads 300 at a position at which the force is receivable makes it possible to suppress the deformation or the like of the body 100 during machining and maintain the straightness or circularity of a machined hole as described above.

As shown in FIG. 4, the guide pads 300 are attached to the outer peripheral surface of the cutting part 110 at the position of the cutting part 110 that is located near the end on the leading end side (however, at a position different from the position of the cutting edge 210 along the circumferential direction). In the present embodiment, two guide pads 300 are provided and aligned along the circumferential direction. Each of the guide pads 300 is fastened to the cutting part 110 by a screw 12 serving as a fastening member. Note that the number of the guide pads 300 attached to the cutting part 110 may be only one or three or more.

As shown in FIG. 4, ejecting ports 112 and grooves 113 are formed near the portions of the cutting part 110 to which the guide pads 300 are attached.

The ejecting ports 112 are holes used to supply the coolant during machining. Inside the body 100, a flow path that is not shown and used to guide the coolant is formed. The end on one side of the flow path is opened at the end of the part to be gripped 120 on the base end side. The ejecting ports 112 are openings formed at the end on the other side of the flow path. During machining, the coolant is supplied from the machine tool to the flow path. The coolant is ejected from the ejecting ports 112 via the flow path and flows into the grooves 113 that will be described next.

The grooves 113 are grooves used to guide the coolant ejected from the ejecting ports 112 to the cutting edge 210 on the leading end side and formed along the outer peripheral surface of the cutting part 110. During machining, the coolant flows to the side of the cutting edge 210 via the space formed between the inner surfaces of the grooves 113 and the inner surface of a machined hole. After that, the coolant is discharged to the outside of the machined hole via the above-described discharging groove 111 together with chips caused by the machining.

The specific shape of the discharging groove 111 will be described with reference to FIG. 5. As shown in FIG. 5, the discharging groove 111 has a linear part G1, a bent part G2, and a linear part G3.

The linear part G1 is the portion of the discharging groove 111 that is located closest to the leading end side. On the inner surface of the linear part G1, a recessed part used to mount the cutting insert 200 described above is formed. The linear part G1 linearly extends along the rotational center axis AX from the position of the cutting insert 200 to the base end side.

The bent part G2 is a portion further extending toward the base end side from the end of the linear part G1 on the base end side. At the bent part G2, the discharging groove 111 extends so as to be bent to be oriented to the side opposite to the rotating direction toward the base end side from the leading end side.

The linear part G3 is a portion further extending toward the base end side from the end of the bent part G2 on the base end side. The linear part G3 linearly extends along the rotational center axis AX as a whole like the linear part G1.

Note that the cross-sectional shape of the discharging groove 111 when perpendicularly cut off with respect to the rotational center axis AX is substantially the same in each of the linear part G1, the bent part G2, and the linear part G3. In each of the portions, the two plane-shaped inner surfaces 111A and 111B of the discharging groove 111 form a fixed angle. The inner surface 111A is one inner surface on which the cutting insert 200 is mounted, and the inner surface 111B is the other inner surface.

Figure 6:
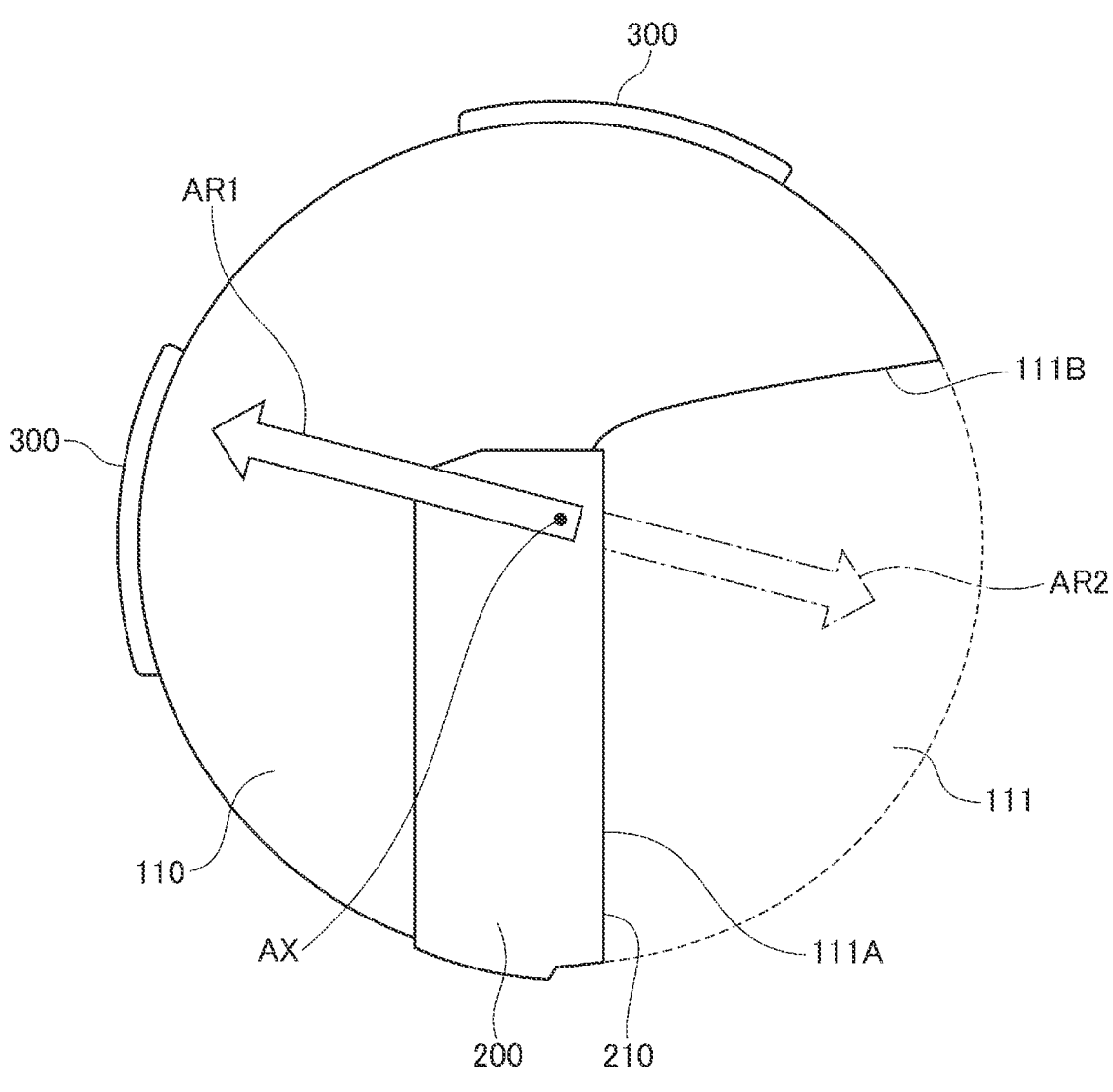
FIG. 6 is a view for describing forces applied to a body according to a comparative example during machining.

As described above, the discharging groove 111 is not formed in a linear shape as a whole but is formed in a shape extending so as to be partially bent (at the bent part G2) in the present embodiment. Prior to the description of the effect of the shape of the discharging groove 111, the configuration of a comparative example will be described. In the comparative example, a bent part G2 like the present embodiment is not provided, a discharging groove 111 linearly extends along a rotational center axis AX as a whole. FIG. 6 is a schematic view of a cutting part 110 of a body 100 according to the comparative example when viewed from its leading end side.

During machining, the body 100 rotates about the rotational center axis AX as described above. At this time, a cutting edge 210 receives a force from a member to be cut. An arrow AR1 in FIG. 6 shows a force received by the cutting edge 210. The direction of the force is opposite to a direction in which the discharging groove 111 is present and the force is directed to the guide pad 300.

Due to the force received by the cutting edge 210, the leading end side of the body 100 makes an attempt to displace in a direction shown by the arrow AR1. However, since the guide pad 300 abuts on and is pressed against the inner surface of a machined hole by the force, the guide pad 300 receives a reactive force. The reactive force is applied in the direction opposite to the direction (shown by the arrow AR1) of the force received by the cutting edge 210. As a result, the displacement of the leading end of the body 100 is suppressed. Therefore, the straightness or circularity of a machined hole is maintained.

Figures 7A, 7B:
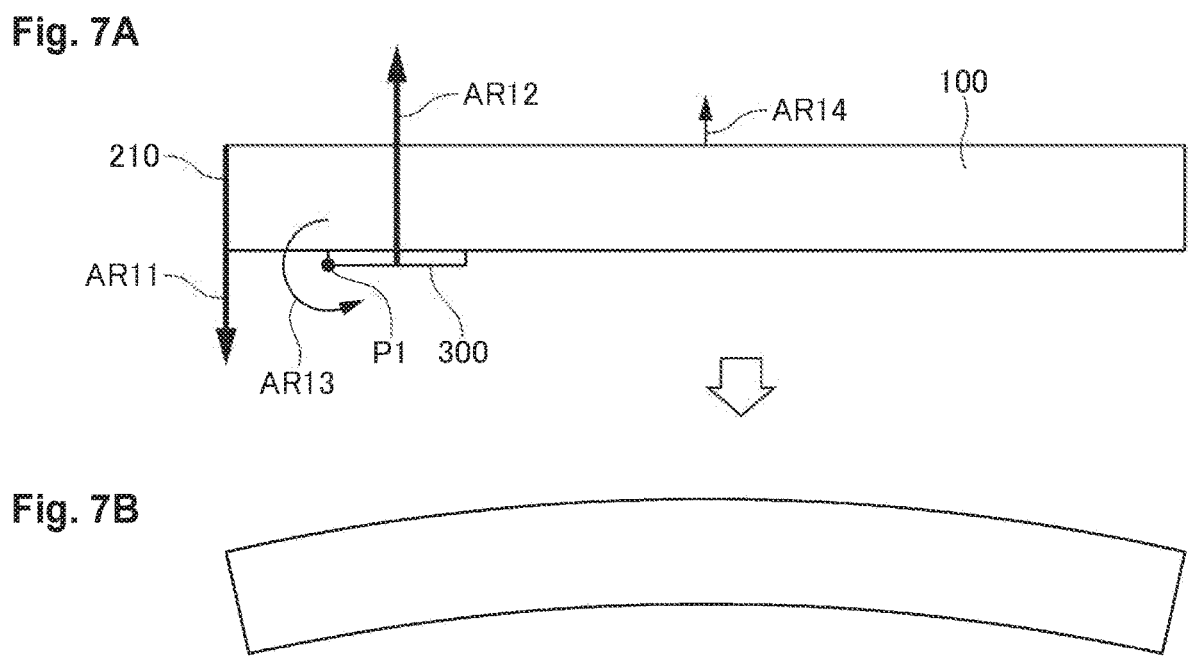

FIG. 7A schematically shows forces applied to the body 100. In FIG. 7A, a left side corresponds to a leading end side, and a right side corresponds to a base end side. An arrow AR11 shows a force received by the cutting edge 210. An arrow AR12 shows a force received from the inner surface of a machined hole by the guide pad 300. As described above, these forces are applied in opposite directions.

However, these two forces are applied to different positions along the longitudinal direction of the body. Therefore, the respective forces do not cancel each other to become zero. In FIG. 7A, a point P1 is a point on the leading end side in the outer peripheral surface of the guide pad 300. As a result of the application of the force shown by the arrow AR11 and the force shown by the arrow AR12 in the opposite directions, bending moment by which the body 100 is rotated in a direction shown by an arrow AR13 about the point P1 is applied to the body 100. The bending moment is applied as a force that causes the central part of the body 100 along a longitudinal direction to displace in a direction shown by an arrow AR14. Thus, the body 100 is bent like a bow during machining as exaggeratedly shown in FIG. 7B.

The force (shown by the arrow AR14) by which the body 100 is bent as described above is directed to the side opposite to the side on which the guide pad 300 is provided.

In FIG. 6, the force is shown by the arrow AR2. The direction of the force is a direction in which the discharging groove 111 is formed. It can be said that the direction of the arrow AR2 is a direction directed to a portion at which the body 100 is hollowed out and is a bent direction in which cross-sectional secondary moment reduces with the formation of the discharging groove 111.

That is, in the comparative example, the direction in which the central part of the body 100 in the longitudinal direction makes an attempt to displace due to the bending moment and the bending direction in which the cross-sectional secondary moment reduces with the formation of the discharging groove 111 agree with each other. Therefore, the central part of the body 100 easily displaces due to the bending moment. Depending on the displacement amount of the central part, there is a possibility that a part of the body 100 abuts on the inner surface of a machined hole and machining accuracy reduces.

In view of this, the discharging groove 111 is partially bent (at the bent part G2) to suppress the displacement of the central part due to bending moment in the body 100 according to the present embodiment.

Figure 8:
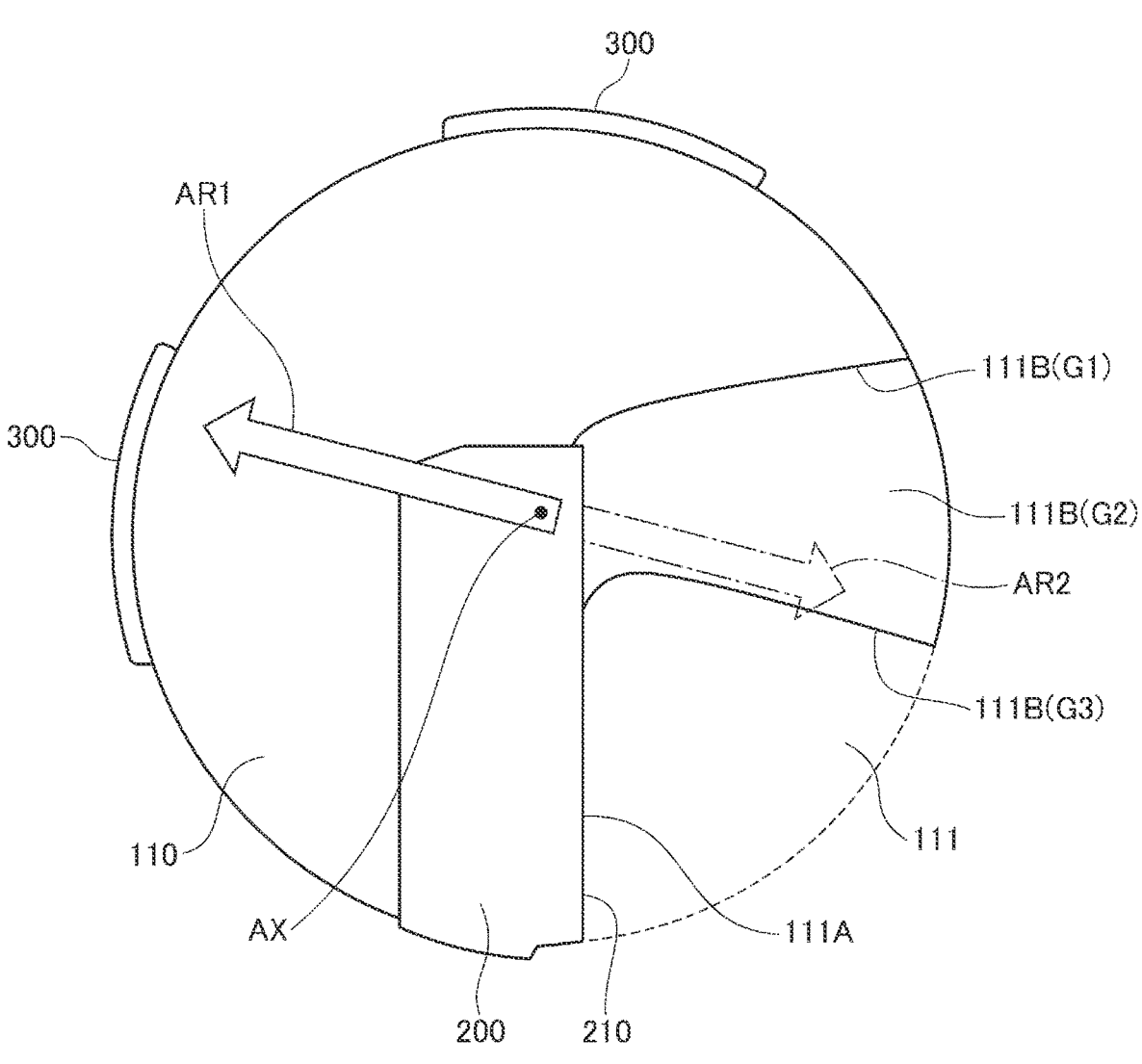
FIG. 8 is a view for describing forces applied to a body according to the present embodiment during machining.

FIG. 8 schematically shows the cutting part 110 of the body 100 according to the present embodiment in the same manner as FIG. 6. In FIG. 8 as well, a force received by the cutting edge 210 is shown by an arrow AR1, and a force by which the body 100 is bent due to bending moment is shown by an arrow AR2.

In FIG. 8, when the portion on the side of the arrow AR2 is viewed from the rotational center axis AX, the portion is not hollowed out by the discharging groove 111 as a whole but is overlapped with the bent part G2 in the present embodiment. That is, when viewed along the rotational center axis AX, the force (shown by the arrow AR2) by which the body 100 is bent is applied to a portion within an angle range from the inner surface 111B of the linear part G1 to the inner surface 111B of the linear part G3.

As described above, the direction in which the central part of the body in the longitudinal direction makes an attempt to displace due to bending moment during machining and the bending direction in which cross-sectional secondary moment reduces with the formation of the discharging groove 111 are different from each other as a result of the provision of the bent part G2 in the discharging groove 111 in the present embodiment. Thus, it is possible to further suppress the bending of the body 100 during machining than before.

Here, when viewed from the leading end side along the rotational center axis AX as in FIG. 8, the angle between the inner surface 111B of the linear part G1 and the inner surface 111B of the linear part G3 is defined as a "torsion angle". It can be said that the torsion angle is the change amount of the angle of the inner surface of the discharging groove, with the position of the discharging groove being changed from the leading end side to the base end side.

Figure 9:
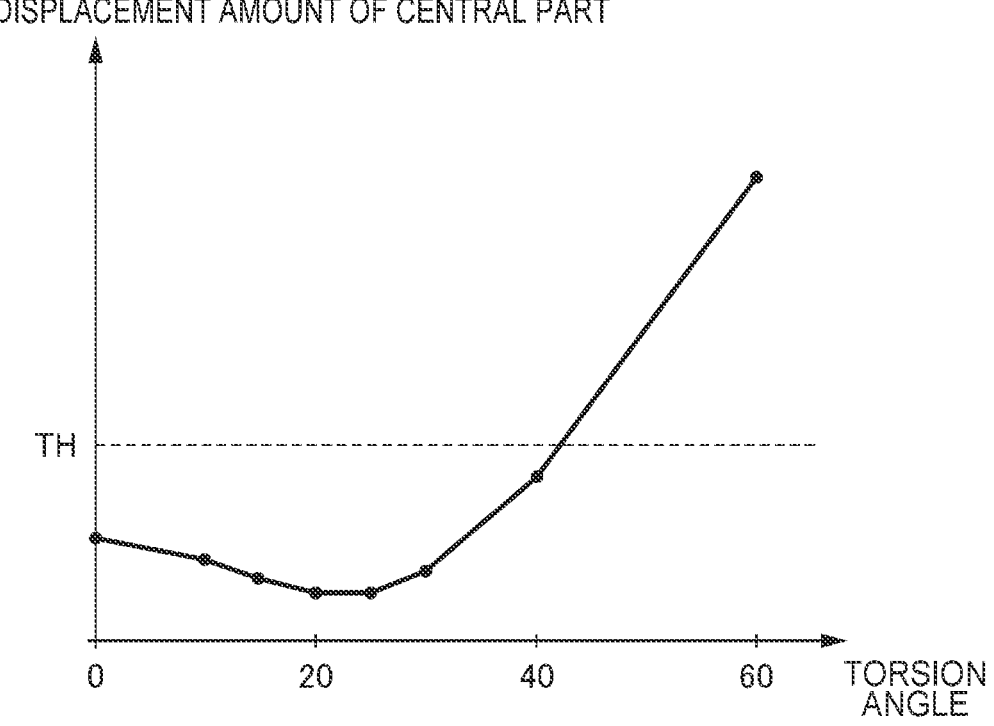
FIG. 9 is a graph showing the relationship between the torsion angle of a groove and the displacement amount of the central part of the body.

FIG. 9 shows the relationship between the torsion angle (horizontal axis) and the displacement amount (vertical axis) of the central part of the body 100 during machining. In FIG. 9, "TH" represents the upper limit value of the displacement amount that is allowable for accurate machining.

As shown in FIG. 9, the displacement amount of the central part falls within the upper limit value TH when the torsion angle is 40 degrees or less.

However, the displacement amount rapidly increases and exceeds the upper limit value TH when the torsion angle exceeds 40 degrees.

Accordingly, the torsion angle preferably falls within 40 degrees in the formation of the discharging groove 111 in the body 100.

Note that the discharging groove 111 is formed in the substantially linear shape as a whole and then partially bent in the present embodiment. Instead of such an aspect, for example, of the discharging groove 111 an entire portion that is located closer to the base end side than the cutting insert 200 or the guide pad 300 may be bent.

In the present embodiment, the only one discharging groove 111 is formed, and therefore the coolant is entirely required to be discharged by the one discharging groove 111. Therefore, the discharging groove 111 is formed to be relatively large as shown in FIG. 8. Specifically, in a cross section obtained when the portion of the body 100 that is located closer to the base end side than the first attachment part 101 and the second attachment part 102 is perpendicularly cut off with respect to the rotational center axis AX, the ratio of the discharging groove 111 accounts for 20% or more. Note that the "ratio" represents the ratio of the cross-sectional area of the discharging groove 111 to the cross-sectional area (that is, the area of the circle) of the body 100 in a case in which the discharging groove 111 is not present. In a configuration in which the ratio is 20% or more, the bending of the discharging groove 111 like the present embodiment is particularly effective.

Note that the ratio is further preferably 30% or more. However, in any case, the ratio is preferably 40% or less in order to secure the rigidity of the body 100.

The present embodiment is described above with reference to the specific examples. However, the present disclosure is not limited to these specific examples. Modifications obtained when persons skilled in the art appropriately make a change to the specific examples are also included in the range of the present disclosure so long as the modifications include the characteristics of the present disclosure. The respective elements and their arrangement, conditions, shapes, or the like included in the respective specific examples described above are not limited to the illustrated ones but may be appropriately modified. The respective elements included in the respective specific examples described above may be appropriately combined together so long as no technical contradiction arises.

What is claimed is:

1. A body for a gun drill, the body comprising:

a first attachment part serving as a portion that is provided on a leading end side of the body and has a cutting edge mounted thereon; and a second attachment part serving as a portion that is provided at a position different from a position of the first attachment part along a circumferential direction and has a guide pad attached thereto on the leading end side, wherein one discharging groove that extends from the leading end side to a base end side of the body and is used to guide and discharge a fluid to the base end side is formed on an outer peripheral surface of the body, the discharging groove has a helix-shaped bent part between the leading end side and the base end side, a first linear part extending linearly from the leading end side to the bent part, and a second linear part extending linearly from the bent part to the base end side, the bent part is oriented in a direction that curves opposite to a rotating direction gradually toward the base end side from the leading end side, when viewed along a rotational center axis, an angle between an inner surface of the first linear part and an inner surface of the second linear part defines a torsion angle, the torsion angle being a change amount of an angle of an inner surface of the discharging groove, with a position of the discharging groove being changed from the leading end side to the base end side, and the torsion angle is 40 degrees or less.

2. The body according to claim 1, wherein, when viewed along a rotational center axis, in a cross section obtained when a portion of the body that is located closer to the base end side than the first attachment part and the second attachment part is cut off perpendicularly with respect to the rotational center axis, a ratio of the cross-sectional area of the discharging groove to the cross-sectional area of the body in a case in which the discharging groove is not present is 20% or more.

3. The body according to claim 1, wherein the second attachment part is provided in plurality to be aligned along the circumferential direction.

* * * * *